Nov. 15, 1960  J. STENBERG  2,960,261
DISTRIBUTOR FOR LIQUID FERTILIZERS AND THE LIKE
Filed Aug. 7, 1958
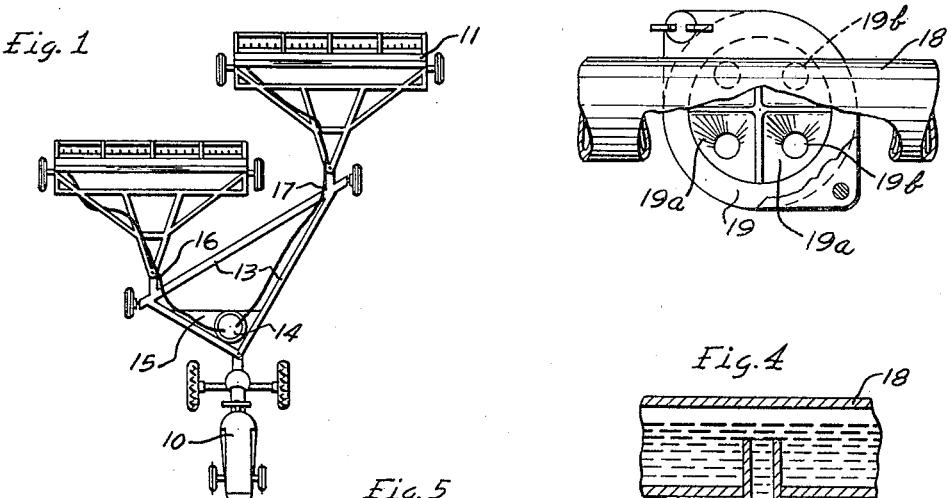
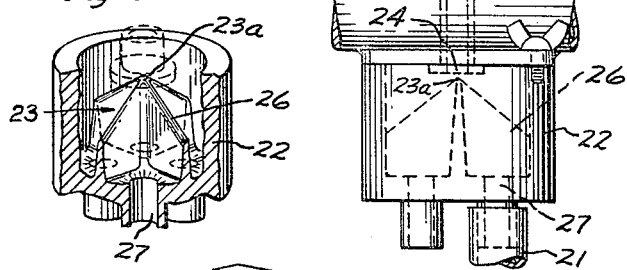
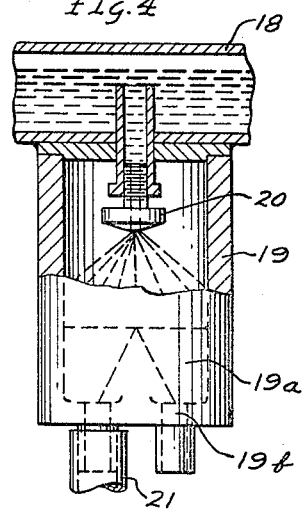
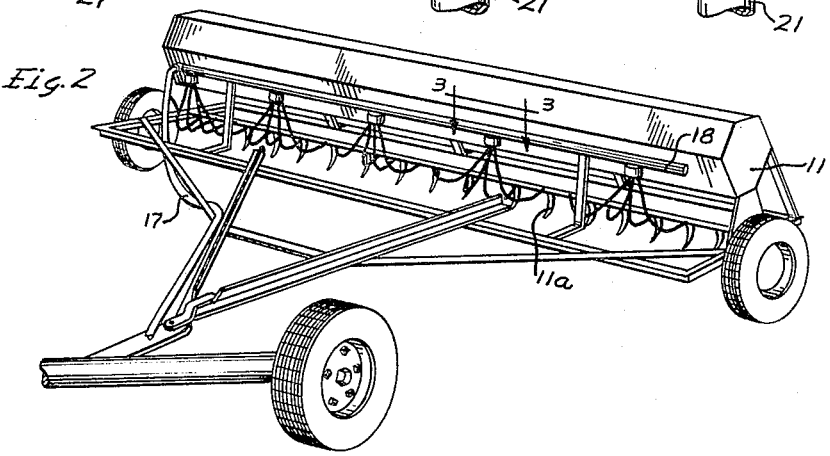
INVENTOR
BY Joseph Stenberg
John W. Adams
ATTORNEY

United States Patent Office 2,960,261
Patented Nov. 15, 1960

2,960,261

DISTRIBUTOR FOR LIQUID FERTILIZERS AND THE LIKE

Joseph Stenberg, Rte. 1, Thief River Falls, Minn.

Filed Aug. 7, 1958, Ser. No. 753,659

5 Claims. (Cl. 222—478)

This invention relates generally to liquid distributing devices and more particularly to a device for uniformly distributing flowing liquid to a number of different outlet ports.

In fertilizer attachments for corn planting drills and other planting machinery, it is desirable to deliver fertilizer directly to the respective rows of seeds being planted. When liquid fertilizer is used, individual fertilizer delivery conduits are provided which extend from the source of liquid supply down to the respective individually separated rows so as to deliver the liquid fertilizer directly to each row being planted. I have found that it is much more convenient to provide a liquid supply tube which delivers uniformly to a plurality of individual liquid distributors which in turn are constructed to divide the liquid supplied thereto equally to a plurality of discharge outlet openings. These openings are connected to the respective liquid delivery conduits which extend downwardly therefrom into close association with the respective seed planting elements for the respective multiple row planting equipment. I have found that with a pressure system, a substantially smaller number of supply nozzles which meter the flow from the distribution tube, are required. This materially reduces the number of nozzles which can become plugged and which require attention. Also, the discharge orifice for a single nozzle spraying to multiple row distribution tubes would be of a larger area and therefore would be less apt to clog than would the smaller orifices for the individual distribution tubes previously required.

It is an object of my present invention to provide a distributing system for liquid fertilizers and the like wherein the fertilizer is accurately metered and evenly distributed to each individual crop row simultaneously with the planting operation thereof.

It is another object of my invention to provide a liquid distributing system capable of accurately metering liquid flow while reducing the probability of clogging of the critical parts of the system.

More specifically, it is an object to provide a flow metering system for liquid which is also particularly constructed to uniformly distribute a measured flow to a plurality of individual distribution conduits.

Still more specifically, it is an object to provide a pressure spray nozzle with a multiple opening distribution receptacle capable of uniformly dividing the spray discharge into a desired number of segments to deliver precisely uniform flow to a plurality of delivery conduits.

It is still another specific object of this invention to provide a gravity type flow metering device for uniformly dividing a gravity flow of liquid into a plurality of equal parts for equal distribution to a plurality of individual delivery conduits.

These and other objects and advantages of my invention will more fully appear from the following descriptions made in connection with the accompanying drawings wherein like reference characters refer to the same or similar parts throughout the several views, in which:

Fig. 1 is a top plan view of multiple row crop planting apparatus to which my invention is attached;

Fig. 2 is a perspective view of a planter with my fertilizer attachment mounted thereon;

Fig. 3 is a fragmentary top plan view with parts thereof broken away and showing my distributing receptacle;

Fig. 4 is an elevational view of the distributing receptacle shown in Fig. 3 with a portion thereof broken away to show in vertical section; and Fig. 5 is an elevational view of a slightly modified form of a distribution receptacle embodying my invention; and Fig. 6 is a perspective view of the bottom of the distribution receptacle shown in Fig. 5.

As best shown in Fig. 1, a conventional farm tractor 10 is attached to a multiple row seeding apparatus consisting in a pair of wheeled seeders 11 and 12 connected to the tractor draw bar by a draft frame arrangement 13. A liquid fertilizer supply tank 14 is mounted on a suitable platform 15 disposed at the forward portion of the draft frame 13 substantially adjacent the draw bar of the tractor. Suitable supply hoses 16 and 17 are provided and extend rearwardly from the tank 14 to permit distribution of liquid fertilizer from said tank to the crop rows being planted by the planters 11 and 12. As best shown in Fig. 2, the hose 17 is connected to a distribution tube 18 which in turn is mounted in fixed relation on the planter 11 as illustrated.

A similar tube is, of course, mounted on the planter 12 but need not be described.

A plurality of distributing heads 19 are connected in fixed relation to the distribution tube 18 and are spaced longitudinally therealong. Suitable spray nozzles 20 discharge liquid from the tube 18 into the respective head elements 19 as best shown in Fig. 4. Each distributing head 19 has a compartmented bottom as best shown in Figs. 3 and 4, to form a number of individual drainage cups 19a each having a discharge opening in the bottom 19b thereof. Delivery conduits such as the flexible hose members 21 are connected to the bottom of each head member 19 and respectively received from the openings 19b at the bottom of the divider cups 19a.

A spray nozzle 20 is designed to distribute the liquid discharged therethrough under pressure into a uniform spray evenly distributed over the entire area of the inside of the head 19 and, therefore, the liquid sprayed therethrough is evenly divided into the respective compartments or cup elements 19a. The liquid is discharged under pressure through spray nozzles 20 and by varying the size of the orifice and/or the pressure of the liquid, the rate of flow of the liquid through the orifice can be easily controlled. The liquid thus sprayed into the respective cups 19a flows down therethrough and through the discharge opening 19b formed in the bottom of each cup. Each of the discharge openings 19b delivers into a delivery conduit 21, as has been described, and each individual delivery conduit extends downwardly from the head 19 into close association with a seed planting element 11a as best shown in Fig. 2, to deliver the liquid fertilizer at a predetermined rate directly to the row of seeds being planted. This, of course, provides immediate nourishment for the seeds and materially improves and hastens the germination, growing and maturity of the individual plants of the crop. The planter 11 is of conventional design and does not form a part of this invention.

An alternative form of my invention is illustrated in Fig. 5 wherein a gravity type of feeder system is provided instead of the pressure system previously described. This, of course, requires an elevation of the tank 14 but entirely eliminates any means for providing pressure to said tank. The head in this form of my invention is designated by the numeral 22 and requires the use of an upwardly extending central dividing member 23 tapered toward the upper pointed end 23a which is disposed immediately below the discharge orifice 24 provided in the supply tube 25 which is similar to supply tube 18 and is supplied from the tank 14 through hoses such as 16 and 17. The liquid flows out through the orifice and onto the sloping sides of the divider member 23, the ridges of which separate the liquid into equal parts which are delivered respectively to the individual cup members 26 formed within the head 22 and which respectively deliver to the openings 27 in the bottom thereof. Conduits such as the conduits 21 then respectively deliver the liquid to the crop rows as described for the pressure system illustrated in Figs. 3 and 4.

It will be seen that I have provided a simple yet highly efficient liquid distributing system particularly designed for use with fertilizing equipment wherein liquid fertilizer is sprayed to each individual row of seeds during the planting operation. Both the pressure system and the gravity system are particularly designed to not only accurately meter and control the flow of liquid to the respective rows, but also to prevent clogging of the metering orifice and other distributing parts of the device.

It will, of course, be understood that various changes may be made in the form, details, arrangement and proportions of the parts without departing from the scope of my invention which, generally stated, consists in the matter set forth in the appended claims.

What I claim is:

1. A system for distributing liquid fertilizers and the like comprising a source of liquid supply, a hollow distributor head mounted in close association to the ultimate delivery location of the liquid, supply conduit means connecting said liquid supply source and said head, said head having a discharge orifice with a central axis and being arranged to receive from said supply conduit means and meter the flow of liquid into said head, divider means provided within said head and symmetrically positioned about said axis and below said discharge orifice to receive liquid discharged therefrom, said divider means being constructed and arranged for dividing the flowing liquid uniformly into a predetermined number of equal portions, a plurality of individual discharge openings respectively receiving said divided portions, and a plurality of delivery conduit members respectively carrying said liquid from said openings to separate discharge locations disposed at selected areas of application.

2. The structure set forth in claim 1 and said divider means defining a plurality of separate open topped compartments positioned to respectively receive equal portions of the liquid discharged from said orifice.

3. The structure set forth in claim 1 and a plurality of said hollow distributor heads respectively receiving uniform flow of liquid from said supply conduit means to provide accurate metering of the liquid into the individual delivery conduit members.

4. A system for distributing liquid fertilizer and the like comprising a liquid supply source under pressure, a distributor head mounted in close association to the ultimate delivery location of the liquid, conduit means connecting the liquid supply source and said head, a plurality of dividing compartments formed in the lower portion of said head, means defining a spray orifice disposed in the upper portion of said head in spaced relation above said compartments and positioned to meter the liquid delivered to said head from said conduit means and designed to produce a spray of liquid equally distributed into said compartments and a plurality of delivery conduits respectively connected with the bottom of said compartments to receive liquid discharged thereinto from said spray nozzle.

5. A system for distributing liquid fertilizer and the like comprising a source of liquid supply, a hollow distributor head mounted in close association with the ultimate delivery location of the liquid and disposed at a lower elevation than said liquid supply source, conduit means connecting said liquid supply source and said head whereby liquid is delivered to said head by gravity flow, means defining a discharge orifice having a central axis in the upper portion of said head to meter the liquid discharged into said head, a plurality of compartments formed in the lower portion of said head and divider means having the upper end thereof disposed in close association to said orifice and arranged symmetrically about said central axis to receive liquid discharged therethrough and constructed and arranged for dividing said flowing liquid and distribute the same equally into the respective compartments and means for carrying said liquid from the respective compartments to the selected area of application.

References Cited in the file of this patent

UNITED STATES PATENTS

| | | |
|---|---|---|
| 2,035,677 | Steinke | Mar. 31, 1936 |
| 2,079,802 | Hauk | May 11, 1937 |
| 2,748,986 | Steel | June 5, 1956 |
| 2,791,353 | Dorn et al. | May 7, 1957 |
| 2,812,613 | Schutz | Nov. 12, 1957 |